US012609379B2

(12) United States Patent
Hong et al.

(10) Patent No.: US 12,609,379 B2
(45) Date of Patent: Apr. 21, 2026

(54) BATTERY MODULE INCLUDING THERMAL INSULATION MEMBER

(71) Applicant: LG ENERGY SOLUTION, LTD., Seoul (KR)

(72) Inventors: Sung Goen Hong, Daejeon (KR); Sang Hyun Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 701 days.

(21) Appl. No.: 17/921,857

(22) PCT Filed: Aug. 12, 2021

(86) PCT No.: PCT/KR2021/010732
§ 371 (c)(1),
(2) Date: Oct. 27, 2022

(87) PCT Pub. No.: WO2022/039442
PCT Pub. Date: Feb. 24, 2022

(65) Prior Publication Data
US 2023/0178824 A1 Jun. 8, 2023

(30) Foreign Application Priority Data

Aug. 20, 2020 (KR) ........................ 10-2020-0104768

(51) Int. Cl.
*H01M 10/658* (2014.01)
*H01M 10/613* (2014.01)
(Continued)

(52) U.S. Cl.
CPC ....... *H01M 10/658* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS

2010/0021802 A1* 1/2010 Yang .................. H01M 50/557
429/159
2010/0075213 A1 3/2010 Mehta et al.
(Continued)

FOREIGN PATENT DOCUMENTS

CN 103325977 A 9/2013
CN 111052437 A 4/2020
(Continued)

OTHER PUBLICATIONS

Machine translation JP2010097693A (Year: 2025).*
(Continued)

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

A battery module preventing prevents heat transfer to an adjacent battery cell when thermal runaway occurs. The battery module includes a plurality of battery cells, each battery cell having electrode leads, a case configured to receive the plurality of battery cells, and a thermal insulation member located between the plurality of battery cells, the thermal insulation member being configured to interrupt heat transfer between adjacent ones of the battery cells. The thermal insulation member is configured to have a composite structure including an outer portion made of plastic having a lower melting point than temperature when thermal runaway occurs and a support member provided in an inner portion of the thermal insulation member, the support member being made of a heat-resistant material having a higher
(Continued)

(a)          (b)          (c)

melting point than the temperature when the thermal runaway occurs.

14 Claims, 4 Drawing Sheets

(51) Int. Cl.
  *H01M 10/647*    (2014.01)
  *H01M 50/211*    (2021.01)
  *H01M 50/24*     (2021.01)
  *H01M 50/505*    (2021.01)

(52) U.S. Cl.
  CPC ......... *H01M 50/211* (2021.01); *H01M 50/24*
         (2021.01); *H01M 50/505* (2021.01)

(56)              References Cited

U.S. PATENT DOCUMENTS

| | | |
|---|---|---|
| 2010/0075221 A1 | 3/2010 | Mehta et al. |
| 2010/0086844 A1 | 4/2010 | Mehta et al. |
| 2010/0136385 A1 | 6/2010 | Hermann et al. |
| 2010/0136424 A1 | 6/2010 | Hermann et al. |
| 2011/0014506 A1 | 1/2011 | Hermann et al. |
| 2011/0014514 A1 | 1/2011 | Mehta et al. |
| 2012/0114990 A1 | 5/2012 | Jeong et al. |
| 2012/0171554 A1 | 7/2012 | Kim |
| 2012/0308857 A1 | 12/2012 | Hermann et al. |
| 2013/0236759 A1 | 9/2013 | Kusaba et al. |
| 2013/0252063 A1 | 9/2013 | Park |
| 2014/0193685 A1 | 7/2014 | Lim |
| 2019/0348725 A1 | 11/2019 | Golubkov |
| 2020/0136114 A1 | 4/2020 | Kondo et al. |
| 2020/0287252 A1 | 9/2020 | Li et al. |
| 2020/0295337 A1 | 9/2020 | You et al. |
| 2020/0343495 A1 | 10/2020 | Kritzer et al. |
| 2020/0411922 A1 | 12/2020 | Kuramitsu et al. |
| 2021/0091428 A1 | 3/2021 | Naito et al. |
| 2021/0273278 A1 | 9/2021 | Yoshida et al. |

FOREIGN PATENT DOCUMENTS

| | | |
|---|---|---|
| CN | 111092176 A | 5/2020 |
| CN | 111226326 A | 6/2020 |
| CN | 210668459 U | 6/2020 |
| EP | 3 676 890 | 7/2020 |
| EP | 3 694 015 A1 | 8/2020 |
| JP | 2010-97693 A | 4/2010 |
| JP | 2010097693 A † | 4/2010 |
| JP | 2011-23355 A | 2/2011 |
| JP | 2012-124319 A | 6/2012 |
| JP | 2012-142288 A | 7/2012 |
| JP | 2013-187119 A | 9/2013 |
| JP | 3191519 U | 6/2014 |
| JP | 6041443 B2 | 12/2016 |
| JP | 2017050164 A * | 3/2017 |
| JP | 6171332 B2 | 8/2017 |
| JP | 2018-206605 A | 12/2018 |
| JP | 2020-68101 A | 4/2020 |
| KR | 10-1244736 B1 | 3/2013 |
| KR | 10-1281811 B1 | 7/2013 |
| KR | 10-1730961 B1 | 4/2017 |
| KR | 10-2018-0060997 A | 6/2018 |
| KR | 10-2019-0082974 A | 7/2019 |
| WO | WO2019/058937 A1 | 3/2019 |
| WO | WO2019/187313 A1 | 10/2019 |
| WO | WO 2020/013120 A1 | 1/2020 |

OTHER PUBLICATIONS

Food Contamination by Packaging—Migration of Chemicals from Food Contact Materials, Table 3.1, Â© 2019 De Gruyter (Year: 2019).*

Applied Plastics Engineering Handbook—Processing, Materials, and Applications (2nd Edition), Table 7.3,Â© 2017 Elsevier (Year: 2017).*

Ullmann's Polymers and Plastics—Products and Processes, 4 Volume Set, Table 5, Â© 2016 John Wiley & Sons (Year: 2016).*

Machine translation JP2017050164A (Year: 2025).*

Gangolli, S.. (2005). <i>Dictionary of Substances and Their Effects (DOSE, 3rd Electronic Edition) .</i> Royal Society of Chemistry (RSC). Retrieved from <br>https://app.knovel.com/hotlink/toc/id:kpDSTEDOS3/dictionary-substances/dictionary-substances (Year: 2005).*

Bryce, Douglas M.. (1996). <i>Plastic Injection Molding, vol. I—Manufacturing Process Fundamentals. </i> Society of Manufacturing Engineers (SME). Retrieved from <br>https://app.knovel.com/hotlink/toc/id:kpPIMVIMP7/plastic-injection-molding/plastic-injection-molding (Year: 1996).*

Extended European Search Report for European Application No. 21858529.7, dated Jul. 17, 2024.

International Search Report for PCT/KR2021/010732 (PCT/ISA/210) mailed on Nov. 23, 2021.

* cited by examiner
† cited by third party

【FIG. 1】
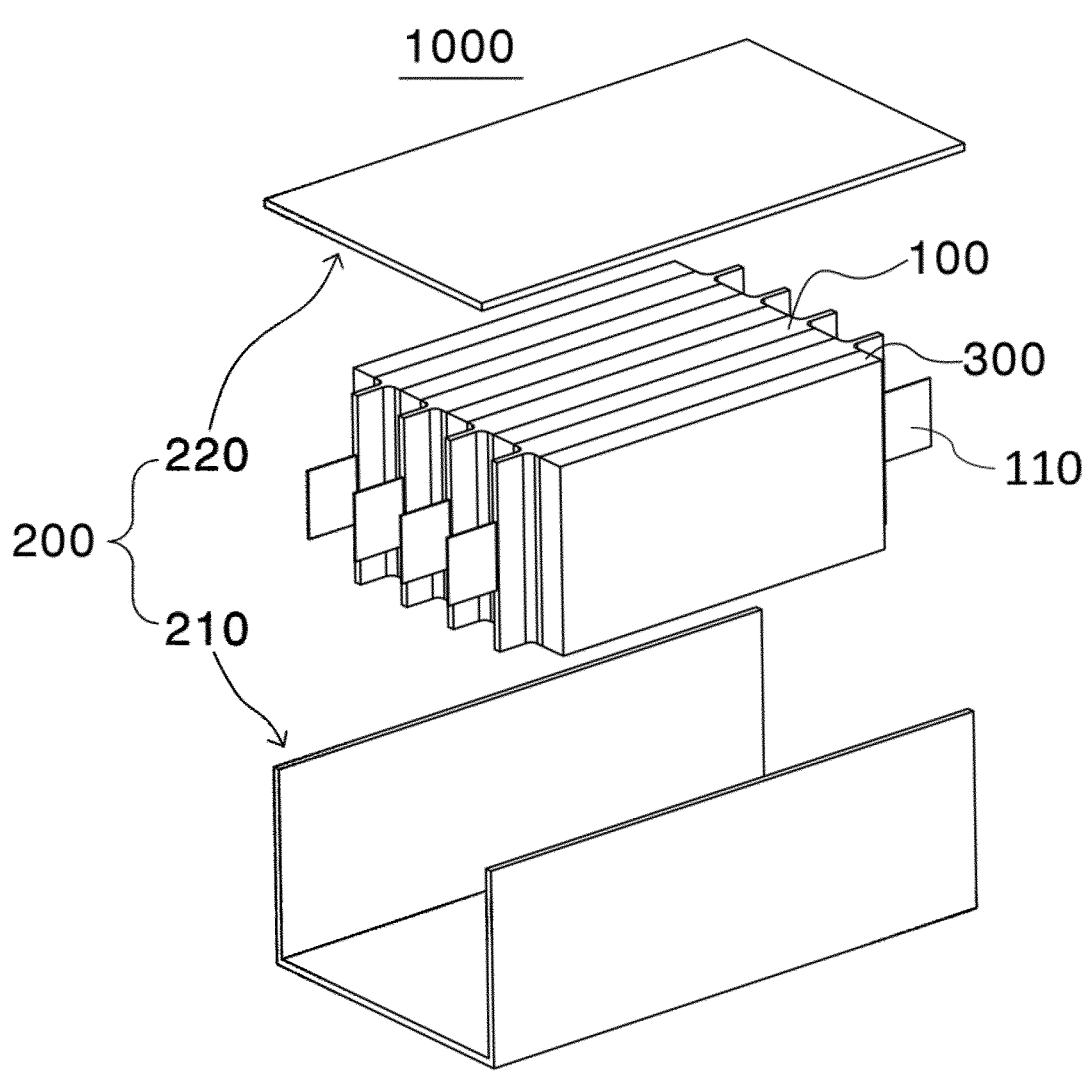

【FIG. 2】
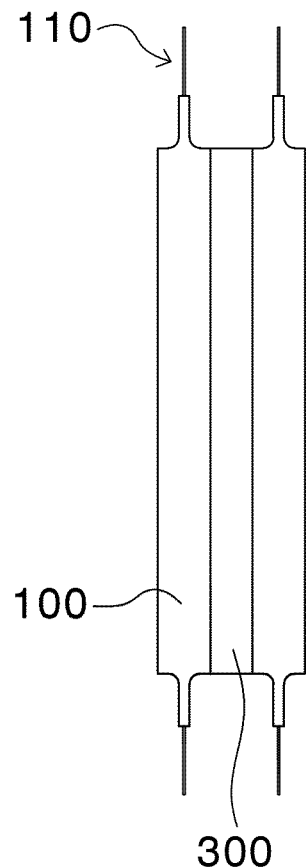

【FIG. 3】
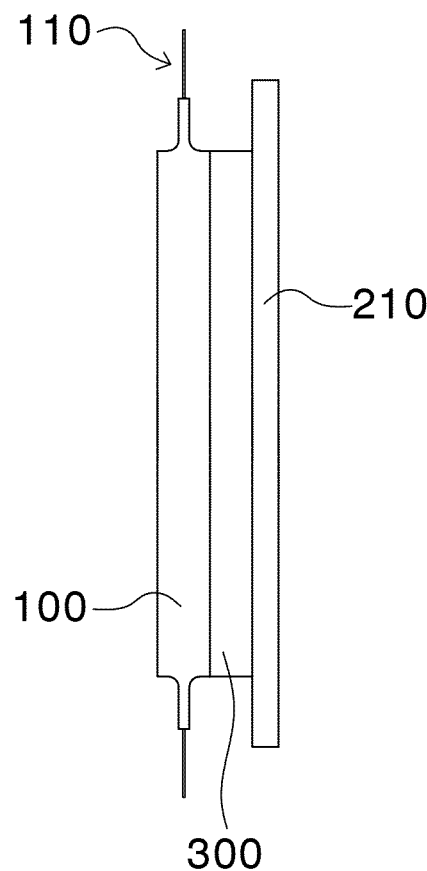

【FIG. 4】
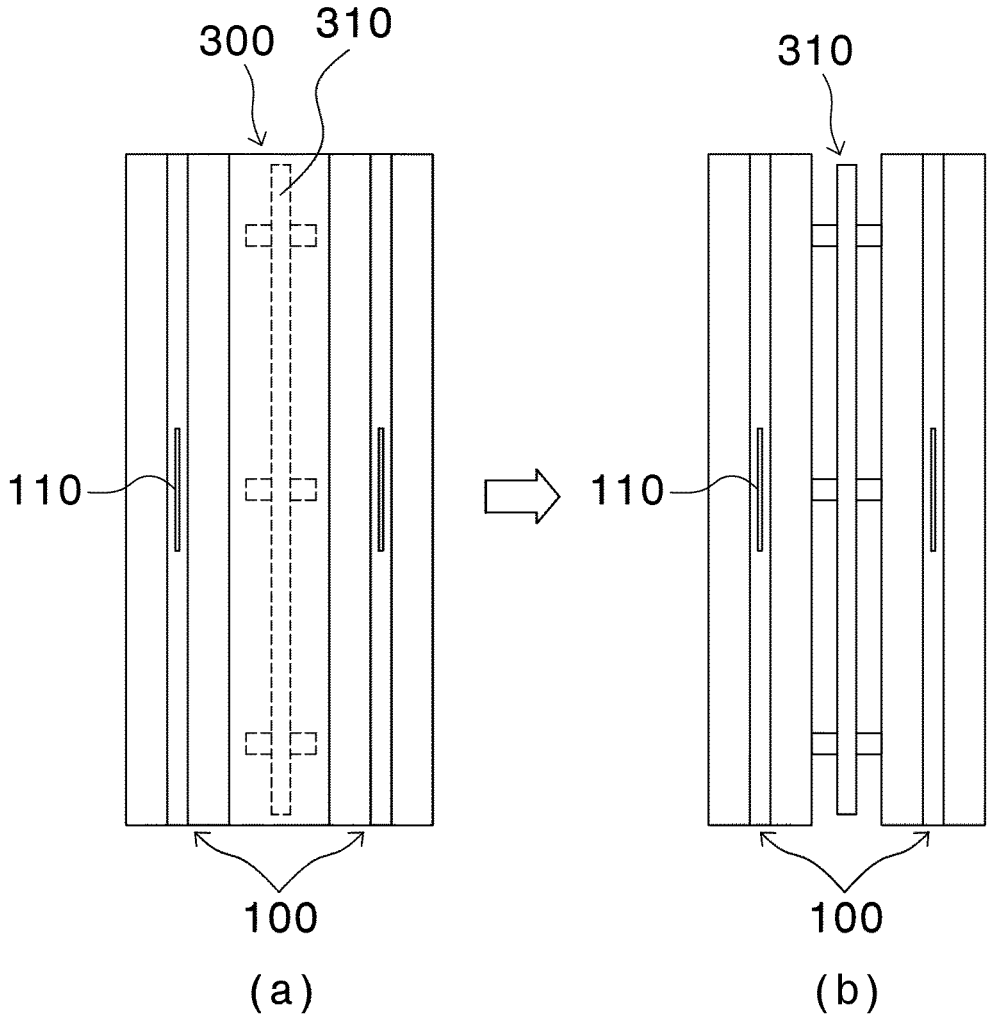
(a)                    (b)
【FIG. 5】
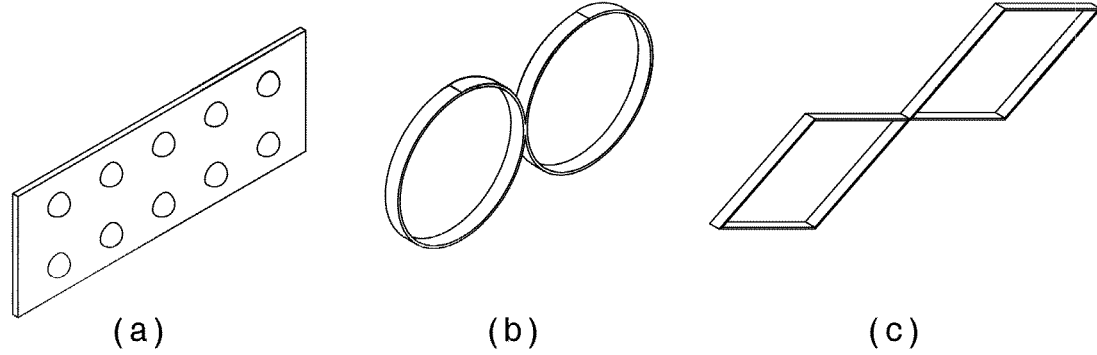
(a)                (b)                (c)

BATTERY MODULE INCLUDING THERMAL INSULATION MEMBER

TECHNICAL FIELD

This application claims the benefit of priority to Korean Patent Application No. 2020-0104768 filed on Aug. 20, 2020, the disclosure of which is incorporated herein by reference in its entirety.

The present invention relates to a battery module including a thermal insulation member having a composite structure capable of, even when thermal runaway occurs in a battery cell, preventing heat transfer to an adjacent battery cell.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, are which energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a battery cell assembly. In addition, battery cell assemblies may be connected to each other in series or in parallel to constitute a battery module depending on required output voltage or charge and discharge capacities. In general, a battery pack is manufactured using at least one battery module by adding an additional component.

The battery module is manufactured so as to have a structure in which the battery cells are disposed densely in the case in order to increase energy density thereof. When thermal runaway occurs in a specific battery cell, therefore, heat may be transferred to battery cells adjacent thereto.

Meanwhile, conventionally, a thermal insulation material is provided between battery cells in order to prevent heat transfer between the battery cells and to prevent direct contact between the battery cells.

In the case in which the conventional thermal insulation material performs, for example, the function of a heat absorbing material having physical properties changed by heat generated when thermal runaway occurs in a battery cell, however, it is not possible to support battery cells and to interrupt heat transfer between the battery cells after thermal runaway occurs.

In addition, a conventional thermal insulation material having a shape remaining unchanged after thermal runaway occurs is disposed in tight contact with a battery cell in which thermal runaway occurs. As a result, it is difficult to discharge heat generated from the battery cell, whereby the battery cell is maintained in a high temperature state, and therefore heat may be transferred to battery cells adjacent thereto at a specific point in time.

DISCLOSURE

Technical Problem

The present invention has been made in view of the above problems, and it is an object of the present invention to provide a battery module including a thermal insulation member having a composite structure capable of, even when thermal runaway occurs in a battery cell, preventing heat transfer to an adjacent battery cell and cooling the battery cell in which thermal runaway occurs.

Technical Solution

In order to accomplish the above object, a battery module according to the present invention includes a plurality of battery cells, each battery cell of the plurality of battery cells having electrode leads, a case configured to receive the plurality of battery cells, and a thermal insulation member located between the plurality of battery cells, the thermal insulation member being configured to interrupt heat transfer between adjacent ones of the plurality of battery cells, wherein the thermal insulation member has a composite structure including an outer portion made of plastic having a lower melting point than a first temperature and a support member provided in an inner portion of the thermal insulation member, the support member being made of a heat-resistant material having a higher melting point than the first temperature.

Also, in the battery module according to the present invention, each of the plurality of battery cells may be a pouch-shaped battery cell having electrode leads protrude in opposite directions.

Also, in the battery module according to the present invention, the case may include a lower case configured to receive the plurality of battery cells and the thermal insulation member and a cover located at the upper part of the lower case.

Also, the battery module according to the present invention may further include a busbar configured to electrically connect the electrode leads of the plurality of battery cells to each other.

Also, in the battery module according to the present invention, the thermal insulation member may be further provided between one of the plurality of battery cells and the case.

Also, in the battery module according to the present invention, the shape of the support member may be maintained even when the thermal runaway occurs to form an air layer between the plurality of battery cells.

Also, in the battery module according to the present invention, the support member may be made of one of metal and polyamide-based plastic.

Also, in the battery module according to the present invention, the support member may have a plurality of protrusions formed on opposite surfaces of a thin plate.

Also, in the battery module according to the present invention, the support member may have rings which are joined to each other.

In addition, a battery pack according to the present invention includes a battery module according to the present invention.

The rings may be tangentially joined.

The support member may have diamond shaped members which are joined to each other.

The diamond shaped members may be joined at an apex of each diamond shaped member.

In addition, a device according to the present invention includes a battery pack according to the present invention.

Advantageous Effects

A battery module according to the present invention has an advantage in that the battery module includes a thermal insulation member having a composite structure in which, when thermal runaway occurs in a battery cell, only a support member provided in the thermal insulation member remains unchanged to form an air layer between battery cells, whereby it is possible to maximize heat insulation and cooling effects while maintaining the distance between the battery cell in which thermal runaway occurs and battery cells adjacent thereto.

DESCRIPTION OF DRAWINGS

FIG. 1 is an exploded perspective view of a battery module according to an embodiment of the present invention.

FIG. 2 is a plan view showing a thermal insulation member located between battery cells in the battery module according to the embodiment of the present invention.

FIG. 3 is a plan view showing a thermal insulation member located between a battery cell and a case in the battery module according to the embodiment of the present invention.

FIG. 4 is a front view showing shapes of a thermal insulation member according to an embodiment of the present invention before and after thermal runaway.

FIG. 5 is a perspective view showing various shapes of a support member according to an embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module according to the present invention will be described with reference to the accompanying drawings.

FIG. 1 is an exploded perspective view of a battery module according to an embodiment of the present invention.

When describing the battery module 1000 according to the present invention in detail with reference to FIG. 1, the battery module 1000 includes a plurality of battery cells 100, each of which has electrode leads, a case 200 configured to receive the battery cells 100, and a thermal insulation member 300 located between the battery cells 100.

Here, each of the battery cells 100 may be a cylindrical battery cell, a prismatic battery cell, or a pouch-shaped battery cell. Hereinafter, the battery module 1000 according to the present invention will be described with the focus on that the battery cell is a pouch-shaped battery cell 100.

The pouch-shaped battery cell 100 includes a battery case having an electrode assembly received therein and a pair of electrode leads.

Here, the electrode assembly may be a jelly-roll type assembly, which is configured to have a structure in which a long sheet type positive electrode and a long sheet type negative electrode are wound in the state in which a separator is interposed therebetween, a stacked type electrode assembly, which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which unit cells are stacked in the state in which a separator is interposed therebetween and are then attached to each other. However, the present invention is not limited thereto.

In addition, a solid electrolyte or a quasi-solid electrolyte manufactured by adding an additive to the solid electrolyte, i.e. a gel-type electrolyte having an intermediate form between liquid and solid, may be used as an electrolyte, in addition to a liquid electrolyte, which is commonly used.

The electrode assembly is received in the battery case, and the battery case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the battery case from the outside, i.e. a thermally-bonded sealed portion between inner layers must exhibit excellent thermal bonding strength.

The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance strength, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air permeation such that the outer layer exhibits high heat resistance and chemical resistance while protecting the electrode assembly. As an example, the outer layer may be made of nylon or polyethylene terephthalate. However, the present invention is not limited thereto.

Meanwhile, the pair of electrode leads 110 is constituted by a positive electrode lead and a negative electrode lead, which may be exposed from the battery case in a state of being electrically connected respectively to positive electrode tabs and negative electrode tabs of the electrode assembly or may be directly connected to the electrode assembly in the state in which tabs are omitted.

In addition, the pouch-shaped battery cell 100 may be a unidirectional lead cell having a structure in which the electrode leads 110, i.e. the positive electrode lead and the negative electrode lead, protrude in the same direction or a bidirectional lead cell having a structure in which the positive electrode lead and the negative electrode lead protrude in opposite directions.

In particular, the following description will be given with the focus on that the battery cell 100 according to the present t invention is a pouch-shaped battery cell 100 having the structure of a bidirectional lead cell 100.

The bidirectional lead cell 100 is generally longer in a direction in which the leads protrude than the unidirectional lead cell, and a member configured to support the battery cell 100 when the battery cell is received in the module is necessary due to the increased length thereof.

The case 200 includes a lower case 210 configured to receive the battery cells 100 and the thermal insulation member 300 and a cover 220 located at the upper part of the lower case 210, the cover being configured to cover the upper part of the lower case after the battery cells 100 and the thermal insulation member 300 are received in the lower case.

In addition, the battery module 1000 according to the present invention may further include various other components, such as a busbar configured to electrically connect the electrode leads to each other and a sensing board configured to sense voltage information of the battery cells.

Meanwhile, FIG. 2 is a plan view showing a thermal insulation member located between the battery cells in the battery module according to the embodiment of the present invention, and FIG. 3 is a plan view showing a thermal insulation member located between the battery cell and the case in the battery module according to the embodiment of the present invention.

When describing the position at which the thermal insulation member 300 is provided in the battery module 1000 with reference to FIGS. 2 and 3, the thermal insulation member 300 may be located between one of the battery cells 100 and another battery cell 100, or may be located between one of the battery cells 100 and another battery cell 100 and between each of the outermost battery cells 100 and a corresponding one of the side surfaces of the lower case 210, in which the battery cells are received.

Since the thermal insulation member is located as described above, the thermal insulation member 300 may serve to insulate the battery cells 100 from each other while supporting the battery cells at a normal temperature, and may serve to prevent heat transfer between the battery cells 100 when thermal runaway occurs in any one of the battery cells.

Meanwhile, although the shape of the thermal insulation member 300 is not particularly restricted, it is preferable for the thermal insulation member 300 to be formed so as to be disposed in tight contact with the side surface of the battery cell 100 that abut the thermal insulation member in consideration of energy density of the battery module 1000.

Also, in the present invention, the area of the side surface of the thermal insulation member 300 is shown as being equal to the area of the side surface of the portion of the battery cell 100 in which the electrode is received. However, the area of the side surface of the thermal insulation member

300 is not limited thereto and may be variously selected within a range in which the thermal insulation member 300 is capable of performing the function described in the present invention and the thermal insulation member does not interfere with other components of the battery module 1000.

FIG. 4 is a front view showing shapes of a thermal insulation member according to an embodiment of the present invention before and after thermal runaway, and FIG. 5 is a perspective view showing various shapes of a support member according to an embodiment of the present invention.

When describing the structure of the thermal insulation member 300 according to the present invention and the behavior of the thermal insulation member when thermal runaway occurs in detail with reference to FIGS. 4 and 5, the thermal insulation member 300 is configured to have a composite structure including an outer portion made of plastic having a lower melting point than temperature when thermal runaway occurs and a support member 310 provided in an inner portion of the thermal insulation member, the support member being made of a heat-resistant material having a higher melting point than temperature when thermal runaway occurs.

Meanwhile, although FIG. 5 shows a structure in which protrusions are formed on a thin plate, a structure in which thin bands each having a predetermined width are connected to each other in ring shapes, or a structure in which thin bands each having a predetermined width are connected to each other in quadrangular shapes as an example of the shape of the support member 310, the support member 310 may be formed so as to have various shapes as long as the area of contact between the support member and the battery cell 100 is as small as possible within a range capable of supporting the battery cells 100.

When the area of contact between the support member 310 and the battery cell 100 is increased, a possibility of heat transfer to an adjacent battery cell 100 via the support member 310 is increased. Consequently, the structure in which the area of contact between the support member 310 and the battery cell 100 is as small as possible is advantageous in the aspect of thermal insulation.

In addition, the support member 310 may be made of any of various well-known materials, such as metal, ceramics, and high heat-resistant plastic, as a heat-resistant material having a higher melting point than temperature when thermal runaway occurs. In consideration of ease and cost in manufacture of the support member 310 and the thermal insulation member 300 including the support member 310, however, it is preferable for the support member to be made of one of metal and high heat-resistant polyamide-based plastic.

When the temperature of the battery cell 100 is normal, plastic constituting the outer portion of the thermal insulation member 300 having the support member 310 therein remains unchanged, whereby the thermal insulation member is disposed in tight contact with the battery cell 100 adjacent thereto over a large area. When thermal runaway occurs, however, plastic constituting the outer portion of the thermal insulation member melts, whereby only the support member 310 provided in the thermal insulation member is left to support the battery cell 100 adjacent thereto over the minimum area.

As a result, an air layer is formed between the battery cells 100 or between the battery cell 100 and the case 200, whereby thermal insulation performance may be improved. In addition, heat generated as the result of thermal runaway is discharged to the outside through convection in the air layer, whereby the function of cooling the battery cell 100 in which thermal runaway occurs may also be performed at the same time.

That is, the support member 310 according to the present invention: from a conventional thermal insulation member in that the support member supports the battery cell 100 with the minimum contact area and the air layer that performs thermal insulation and cooling functions is formed between the battery cells 100 when thermal runaway occurs, unlike the conventional thermal insulation material, which performs the function of a thermal insulation material that interrupts heat transfer when thermal runaway occurs or performs the function of an absorbing material that absorbs heat.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

1000: Battery module
100: Battery cell
110: Electrode lead
200: Case
210: Lower case
220: Cover
300: Thermal insulation member
310: Support member

The invention claimed is:

1. A battery module capable of, when thermal runaway occurs in a battery cell, preventing heat transfer to an adjacent battery cell, the battery module comprising:
  a plurality of battery cells, each battery cell of the plurality of battery cells having electrode leads;
  a case configured to receive the plurality of battery cells; and
  a thermal insulation member located between the plurality of battery cells, the thermal insulation member being configured to interrupt heat transfer between adjacent ones of the plurality of battery cells,
  wherein the thermal insulation member has a composite structure comprising an outer portion made of plastic having a lower melting point than a first temperature and a support member provided in an inner portion of the thermal insulation member, the support member being made of a heat-resistant material having a higher melting point than the first temperature,
  wherein the support member is not in contact with a battery cell of the plurality of battery cells prior to thermal runaway, and
  wherein the support member is configured to be in contact with an adjacent battery cell of the plurality of battery cells after thermal runaway.

2. The battery module according to claim 1, wherein each of the plurality of battery cells is a pouch-shaped battery cell, and
  wherein the electrode leads protrude in opposite directions.

3. The battery module according to claim 1, wherein the case comprises:
  a lower case configured to receive the plurality of battery cells and the thermal insulation member; and
  a cover located at an upper part of the lower case.

4. The battery module according to claim 3, further comprising a busbar configured to electrically connect the electrode leads of the plurality of battery cells to each other.

5. The battery module according to claim 1, wherein the thermal insulation member is further provided between one of the plurality of battery cells and the case.

6. The battery module according to claim 1, wherein a shape of the support member is maintained even when the thermal runaway occurs to form an air layer between the plurality of battery cells.

7. The battery module according to claim 6, wherein the support member is made of one of metal and polyamide-based plastic.

8. The battery module according to claim 7, wherein the support member has a plurality of protrusions formed on opposite surfaces of a thin plate.

9. A battery pack comprising the battery module according to claim 1.

10. A device comprising the battery pack according to claim 9.

11. A battery module capable of, when thermal runaway occurs in a battery cell, preventing heat transfer to an adjacent battery cell, the battery module comprising:
  a plurality of battery cells, each battery cell of the plurality of battery cells having electrode leads;
  a case configured to receive the plurality of battery cells; and
  a thermal insulation member located between the plurality of battery cells, the thermal insulation member being configured to interrupt heat transfer between adjacent ones of the plurality of battery cells,
  wherein the thermal insulation member has a composite structure comprising an outer portion made of plastic having a lower melting point than a first temperature and a support member provided in an inner portion of the thermal insulation member, the support member being made of a heat-resistant material having a higher melting point than the first temperature,
  wherein the support member is not in contact with a battery cell of the plurality of battery cells prior to thermal runaway, and
  wherein the support member has rings which are joined to each other.

12. The battery module according to claim 11, wherein the rings are tangentially joined.

13. A battery module capable of, when thermal runaway occurs in a battery cell, preventing heat transfer to an adjacent battery cell, the battery module comprising:
  a plurality of battery cells, each battery cell of the plurality of battery cells having electrode leads;
  a case configured to receive the plurality of battery cells; and
  a thermal insulation member located between the plurality of battery cells, the thermal insulation member being configured to interrupt heat transfer between adjacent ones of the plurality of battery cells,
  wherein the thermal insulation member has a composite structure comprising an outer portion made of plastic having a lower melting point than a first temperature and a support member provided in an inner portion of the thermal insulation member, the support member being made of a heat-resistant material having a higher melting point than the first temperature, wherein the support member is not in contact with a battery cell of the plurality of battery cells prior to thermal runaway, and wherein the support member has diamond shaped members which are joined to each other.

14. The battery module according to claim 13, wherein the diamond shaped members are joined at an apex of each diamond shaped member.

\* \* \* \* \*